United States Patent [19]
Fitch

[11] Patent Number: 5,557,539
[45] Date of Patent: Sep. 17, 1996

[54] APPARATUS AND METHOD FOR TESTING AN INTERACTIVE VOICE MESSAGING SYSTEM

[75] Inventor: Todd M. Fitch, Sunnyvale, Calif.

[73] Assignee: Centigram Communications Corporation, San Jose, Calif.

[21] Appl. No.: 258,395

[22] Filed: Jun. 13, 1994

[51] Int. Cl.[6] ..................................................... G06F 17/00
[52] U.S. Cl. ......................................................... 364/514 B
[58] Field of Search .............................. 364/514 B, 579, 364/580; 395/375; 371/16.4

[56] References Cited

U.S. PATENT DOCUMENTS

| | | | |
|---|---|---|---|
| 5,121,342 | 6/1992 | Szymborski et al. | 364/514 B |
| 5,438,528 | 8/1995 | Emerson et al. | 364/514 B |
| 5,442,759 | 8/1995 | Chiang et al. | 395/375 |
| 5,448,722 | 9/1995 | Lynne et al. | 364/580 |

OTHER PUBLICATIONS

Netview at a Glance; IBM Corporation Manual, 1992, pp. 1–9.

*Primary Examiner*—Ellis B. Ramirez
*Attorney, Agent, or Firm*—Flehr, Hohbach, Test, Albritton & Herbert

[57] ABSTRACT

A testing system for an interactive voice messaging system comprises a processor, a memory storing processor procedures and test cases, and a telephonic interface. The processor procedures include a master procedure and subprocedures for debugging the test case, retrieving and displaying documents, storing and retrieving database items, test case procedure development and editing, and test report generation. The processor procedures are all hyperlinked together so that the testing system can call any of the procedures at specified times in order to permit a user to read or modify database entries, documents and test cases when necessary. A method for testing an interactive voice messaging system includes steps for performing the test case control system of the present invention. The present apparatus and method are also applicable to testing private branch exchanges (PBX) and other telephonic based systems.

19 Claims, 6 Drawing Sheets

APPARATUS AND METHOD FOR TESTING AN INTERACTIVE VOICE MESSAGING SYSTEM

FIELD OF THE INVENTION

The present invention relates generally to testing hardware and software systems. More particularly, the invention relates to testing telephony equipment including voice mail systems, private branch exchange (PBX) systems, and other telephonic based systems.

BACKGROUND OF THE INVENTION

Telephone equipment has become increasingly sophisticated since the development of computers. Presently, many telephone systems are capable of routing thousands of calls per second, transferring calls to alternate locations, conferencing additional parties into the initial telephone call, and even delivering and taking messages.

Telephone systems have developed to the point where they can instruct a caller to press specific keys in order to select services, business departments, or identified persons. Additional features have been developed including voice mail. Voice mail is a system permitting a person to leave an outgoing message indicating that he is away from his desk and requesting the caller to leave a message. Usually, the person can also indicate that the caller may dial "0" to get personal help from an operator. If the caller leaves a message, it is stored by the voice mail system for later retrieval. The person for whom the message was left can then call from any telephone and retrieve the message by keying in the correct sequence of keys on a touch tone pad.

Voice message systems are computer based systems. As these telephonic systems become more sophisticated and more capable, there is an increasing need to properly test the equipment while it is being developed and before it is shipped to the customer. Testing is important to insure quality and capability of the systems for delivery.

Current testing techniques include calling various numbers and verifying if the call was properly handled. Some test systems can handle the interactive process and verify if the interaction is properly functioning. However, current systems lack the capability to permit a test engineer to set up and execute test procedures while accessing a plurality of relevant database, document and test case information.

SUMMARY OF THE INVENTION

The present invention describes an apparatus and method for permitting a test manager to set up and execute test procedures while accessing a plurality of relevant database, document and test case information.

A test case control system (TCCS) is described for controlling testing of an interactive voice message system. The TCCS has a memory for storing a plurality of procedures. These procedures include a master procedure having hyperlinks to subprocedures. The master procedure maintains hyperlinks to user selected subprocedures such as a debug procedure, a document procedure, a database procedure, a test case procedure, a test report procedure and other procedures.

In operation, a processor executes the master procedure. The master procedure includes routines for displaying options to a user for input selection by the user. These options include hyperlinked procedure launch access from the master procedure to any of the selected subprocedures.

The TCCS master procedure is responsive to the user's selection and switches among the procedures based on the user's input and the hyperlinks to the subprocedures in memory.

There is a processor for executing the procedures and generating test signals. There is also a communication path for communicating with the system under test (SUT). In a preferred embodiment the SUT is an interactive voice message system. The processor includes a communication port for transmitting the signals to the interactive voice message system and for receiving signals from the interactive voice message system. In this manner, the TCCS tests the SUT to verify that it is functioning properly.

An additional embodiment of the present invention includes a network for the TCCS. The network can provide the TCCS with access to test cases, documents, and other information stored in remote locations or used by other test engineers on the network.

The method of the present invention describes steps for performing the TCCS.

DETAILED DESCRIPTION OF A PREFERRED EMBODIMENT

A test case control system (TCCS) is used for controlling testing of telephony equipment. The preferred embodiment will describe in detail the application of a TCCS for controlling testing of an interactive voice message system.

Figure 1:
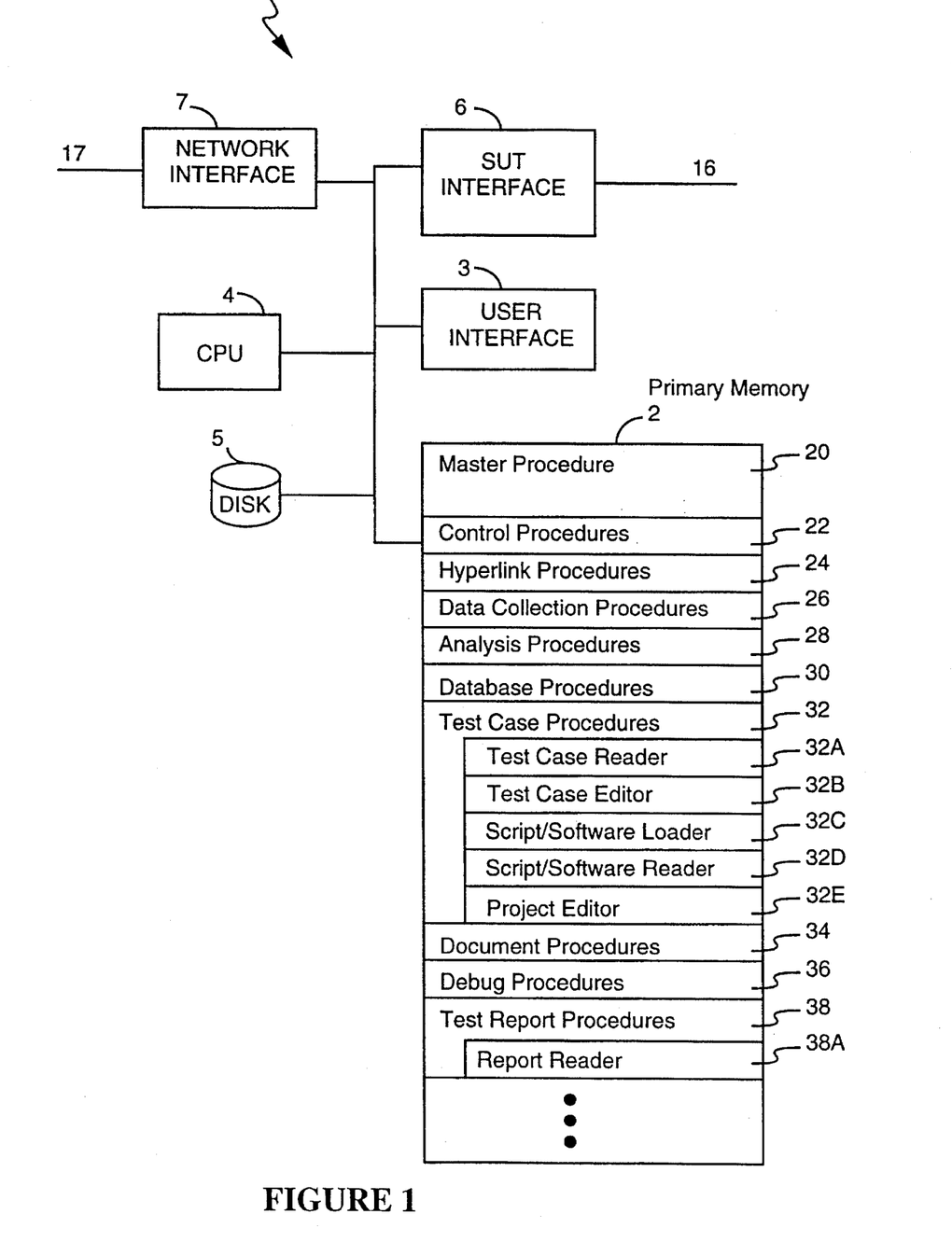
FIG. 1 depicts a test case control system including a plurality of procedures. This figure also shows an optional network interface.

FIG. 1 depicts a TCCS 1 comprising a primary memory 2, a user interface 3, a central processing unit (CPU) 4, a disk memory 5, and a system under test (SUT) interface 6. Communication line 16 is depicted in FIG. 1 to show a communication path to a SUT. An option shown in FIG. 1 is a network interface 7, leading to a network 17.

Primary memory 2 contains a plurality of procedures. These procedures include a master procedure 20, control procedures 22, hyperlink procedures 24, data collection procedures 26, and analysis procedures 28. These procedures further include database procedures 30, test case procedures 32, a document procedure 34, a debug procedure 36, a test report procedure 38 and others. The operation of these procedures is discussed below.

Figure 2:
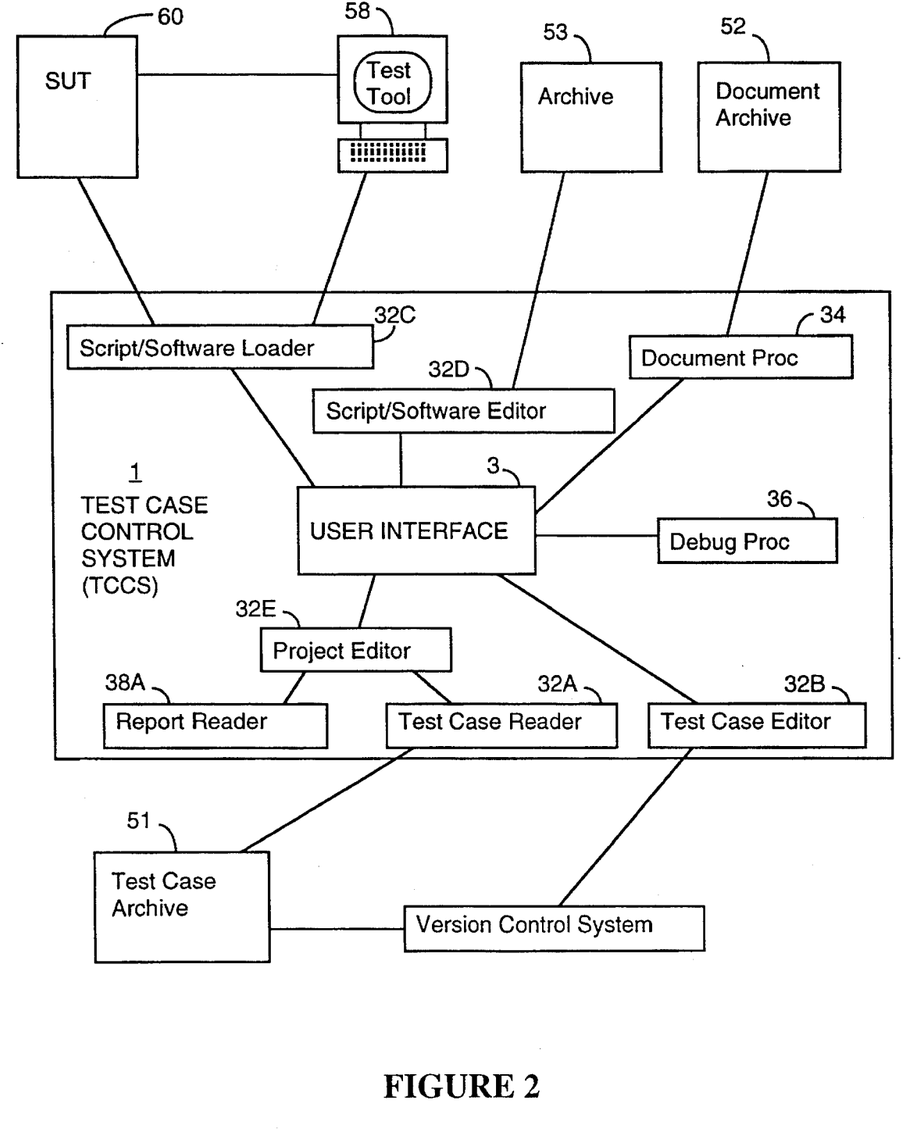
FIG. 2 depicts a software architecture of the test case control system.

FIG. 2 shows the TCCS 1 in a testing environment. The TCCS 1 is depicted with a user interface 3. This user interface permits the user to write test cases, retrieve and select a variety of existing test cases, modify existing test cases, execute test cases, read and write bug reports from the test cases, and many additional functions.

Test cases in the preferred embodiment are special documents that are used to reference and link to all the procedures and related files (including configuration files, explanatory documents and the like) that define a particular test or set of tests.

There are several archives present in FIG. 2. Archives 51, 52 and 53, exist for the purpose of storing information. Archive 51 stores test cases, archive 52 stores documents (e.g., hardware and software specifications, user manuals), and archive 53 stores other information such as test scripts, software and additional information. Archival storage is handled by the TCCS and is transparent to the user.

Test tool 58 is used to run user selected test procedures on the system under test (SUT) 60. The test tool is the hardware that is connected to the SUT for the purpose of executing the tests on the SUT. This test tool has the capability to interpret the TCCS test commands and execute the commands to perform the test on the SUT. In the preferred embodiment, the test tool sends and receives voice, DTMF (dual tone multi-frequency), and electronic signals to and from an interactive voice message system. One type of test interaction performed by the test tool comprises accessing different voice message locations and verifying that the voice message system properly routes the call and stores a message in the proper location. Another type of test interaction perform by the test tool is testing the system manager functions for configuring and modifying the configuration of the system under test.

The TCCS 1 software is shown in FIG. 2 as a master procedure having a user interface 3, and relating together subprocedures including a script/software loader 32C, a script/software editor 32D, a document procedure 34, a debug procedure 36, a project editor 32E, a test report reader 38A, a test case reader 32A, and a test case editor 32B. In the preferred embodiment, the master procedure 20 is run under an operating system such as Microsoft Windows, Windows NT, or X Windows. The user interface 3 is responsible for communicating the options available to the user and for receiving user selected options. This is done through the test case master procedure by displaying the options on a computer display screen. The user then selects an option by using a mouse or the cursor control arrows.

An example Test Case is given below under the heading EXAMPLE TEST CASE. The brackets {} represent hyperlinks to subprocedures. These brackets {} are user selectable options that launch a subprocedure application or load a set of data (e.g., a configuration file). In the case that the subprocedure is an application, the launch is an executable function. In the case that the subprocedure is data loading function or procedure, such as for loading a document, the launch will execute the function necessary to retrieve and view or deliver the data.

As previously stated, the TCCS master procedure controls the launching of the user selected options. This is done by using hyperlinks. In particular, each hyperlinked option in a test case or document includes an identifier of the procedure or file to be used when the option is selected. The hyperlink procedures 22 then use the identifier in the selected option to locate the referenced file or files (typically by using a network's file management procedures), which may be located on the user's computer or on another computer or apparatus coupled to the user's computer by a network.

Alternately, in a computer system that does not have a file management system, the TCCS master procedure 20 can maintain a link table that identifies the storage locations of the option subprocedures. When any hyperlinked option is selected by the user, the TCCS master procedure locates the file(s) associated with the option by table lookup, and then launches or loads the located file(s). The major problem with this alternate methodology is that if files are moved or renamed by procedures outside the TCCS master procedure 20 (e.g., by a word processing program used to modify documents references by a test case), then the link table used by the TCCS master procedure 20 will contain invalid addresses until it is updated.

When a selected subprocedure's execution is completed, a pointer pointing back to the master procedure is used to return control to the master procedure.

In the preferred embodiment, communication with the SUT 60 is accomplished by a telephone line connection. This can also be accomplished using any of several communication protocols including RS-232, IEEE 488, ethernet, token ring or a custom connection.

A communication interface between the test tool and the SUT includes a transmitter, one or more communication lines, and a receiver. In the preferred embodiment, the transmitter is a standard telephone compatible transmitter, the communication lines are a set of telephone wires, and the receiver is a standard telephone compatible receiver. When the present invention is used to test equipment other than telephony equipment, the set of transmitter, communication and receiver equipment would depend on the equipment being tested.

The script/software loader 32C is a subprocedure that loads a stored script or test software into a SUT or into the test tool, depending on the testing situation.

The script/software editor 32D is a subprocedure that retrieves a test script or software that the user can then review and/or edit. The software/script editor 32D also enables users to create a new test script, and to store edited test scripts. This permits the user to create and store numerous test scripts.

The document procedure 34 is a subprocedure that permits the user to retrieve and display a document. The document may be an instruction manual, a test file, or any other readable information.

The debug procedure 36 a subprocedure that collects information from the test tool 58 and/or SUT 60 and maintains a list of problems occurring during the execution of the test case. The user can then review the stored debugging information to determine what actions, if any, are needed to correct reported anomalies.

The project editor 32E is a subprocedure that permits the user to edit test cases, documents, and other TCCS related data.

The test case procedure is a subprocedure that includes the capability to create or edit test cases without terminating the master procedure. This is done by retrieving and displaying a selected test case, and then editing the test case in accordance with user selected options. The test case is then run on the SUT or stored in memory for later use or reference.

The test case reader 32A is a subprocedure that provides for the retrieval and display of a test case.

The test case editor 32B is a subprocedure that provides for the retrieval, editing and storage of a test case.

The test case editor also provides for the compilation and creation of a plurality of test case execution lists. A test case execution list is a list of test cases that are to be executed in a particular order. These lists are helpful to the user in order to facilitate executing a particular sequence of test cases, as well as to indicate the order in which a sequence of test cases were executed.

The test tool 58 and/or the TCCS 1 collects data during the execution of test cases to generate test reports. The generated test report includes information on the test case that was run, the scripts that the user selected to run the test case, and the performance of the test case by the SUT.

A report reader 38A is a subprocedure that includes the capability to load and review test results. The retrieval of the test report is performed by a hyperlink from the Test Results section of the test case example shown below by selecting option labelled {RVW} in the test case. This selection permits the user to view the test results and view relevant statistical parameters. These parameters can include time of initiating test, time of pass, time of failure, number of successful iterations, number of failed iterations, and other information.

The database procedures 30 are utility procedures for database storage, retrieval and display. Items in the database include information on different systems, different tests that have been historically performed on various systems, customer system information, customer information and locations of systems, and other additional information.

Figure 3:
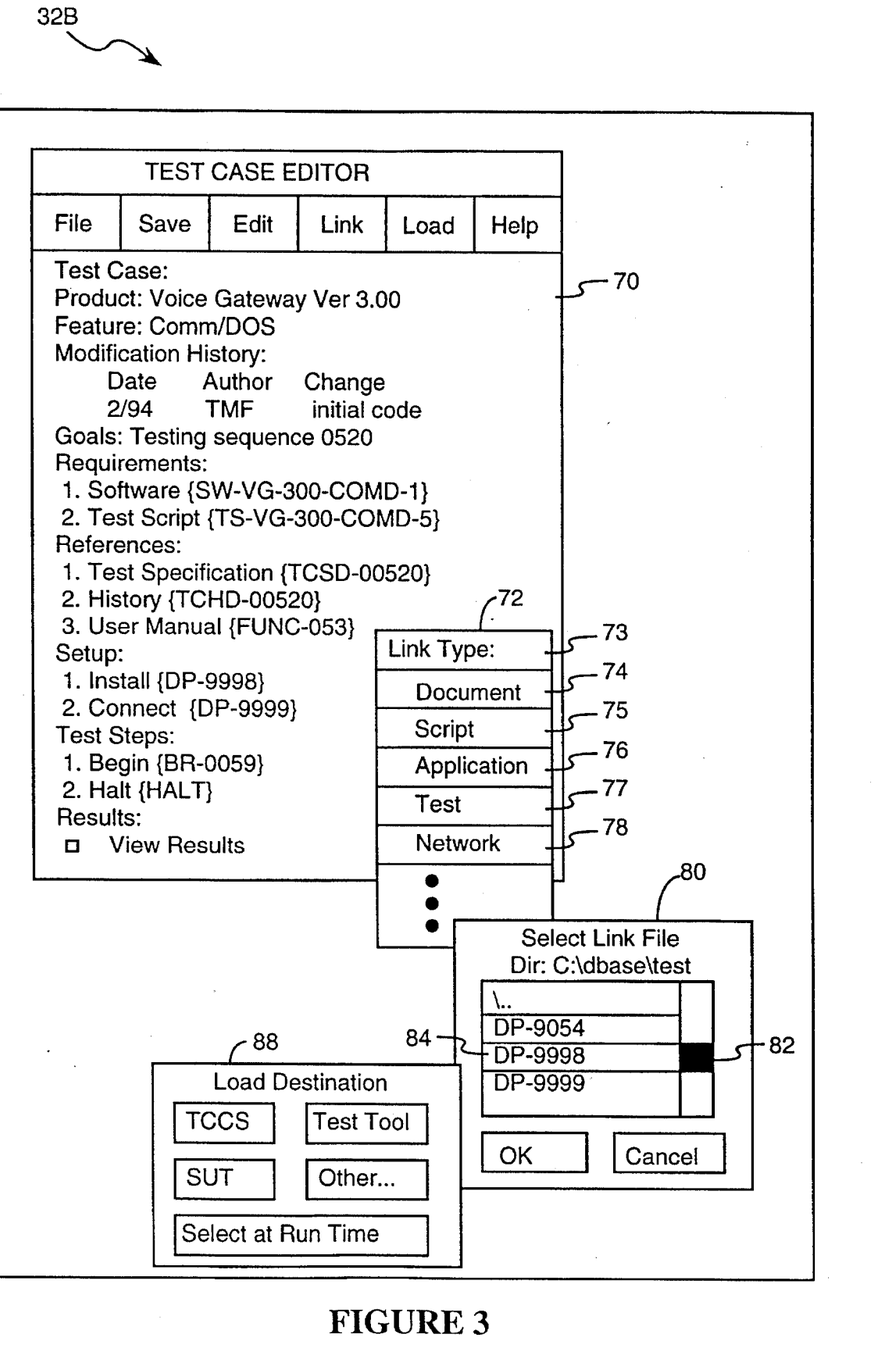
FIG. 3 depicts a test case editor of the test case control system.

FIG. 3 depicts the test case editor 32B of the TCCS. There is a main development window 70 that includes user selectable buttons for accessing test cases, and several windows 72, 80, 88 that include user selectable features for defining links in the test case. The user develops the test case in window 70 according to specific rules that can be reviewed during test case development by selecting the help button at the top of the window. Moreover, since the TCCS runs under a multiprocessing computer environment, other applications can also be run to aid the user in the development of the test case or for the user to reference for other purposes.

In the test case development window 70, the test case under development contains several bracketed {} options representing hyperlinks. These bracketed options contain information about the links. When the test case is written, or modified, the links are defined. In window 70, when the user selects the Link button, window 72 appears for the user to define the Link Type 73. The Link Type options include document 74, script 75, application 76, test 77, network 78 and others. The selected link type is saved in the test case as an attribute of a hyperlink. For example, a document type link is one that initiates a document retrieval and display. A script type is one that initiates a script retrieval. The script can be displayed and edited by use of the Edit button, or loaded into a SUT or test tool by use of the Load button. An application type is one that initiates execution of an application. A test type is one that initiates a test. A network type is one that initiates communication over the network. Each Link Type is capable of custom definition to execute a batch of tasks associated with the link.

When the user selects the Link Type from window 70, window 80 appears. Window 80 is a file selection window that includes a list of files for including in the link. For example, window 80 includes a file selection navigator with a cursor controlled identifier 82 that identifies files 84 for selection by the user. The file selection navigator can display any applicable file for including in the link. Once the user has located the desired file, the OK button is selected.

Once a Link File is selected, window 88 appears for the user to identify the desired load location. The possible locations include the TCCS, SUT, Test Tool and other locations such as a network location or a user defined location. Another possible location is one that is defined at Run Time. This option prompts the user for a load location at Run Time. The file definition is saved in the test case as an attribute to the link. During operation, when the bracketed {} hyperlink is selected by the user, the processor will execute the link in accordance with the attributes that are defined during test case development in the windows 72, 80, and 88.

Figure 4:
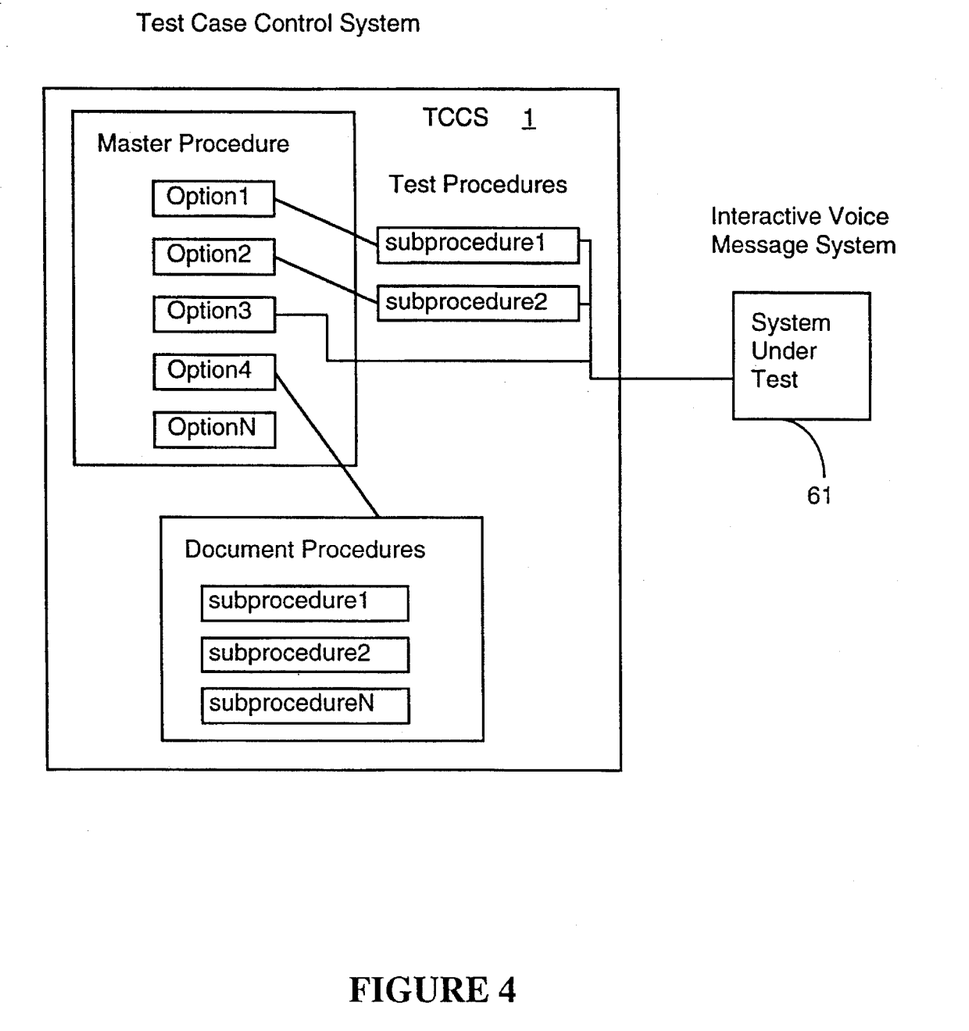
FIG. 4 depicts a test case control system showing hyperlinks from a master procedure to subprocedures.

FIG. 4 is organized to show the operational features of the TCCS 1. Master procedure 20 displays user selectable options. Typically, the selection process is performed using a "mouse" pointer device, and in particular by pressing a button on the mouse when the corresponding mouse identifier on the user's display is over the desired option. FIG. 4 shows the relationship among the master procedure, various options, various test subprocedures and various document subprocedures. This operational depiction is simplified, and could be drawn to encompass all possible operational procedures. If all operational procedures were drawn in, there would be links from the master procedure to each of the possible operational subprocedures. When the master procedure options are chosen, the subprocedures are then activated.

Figure 5:
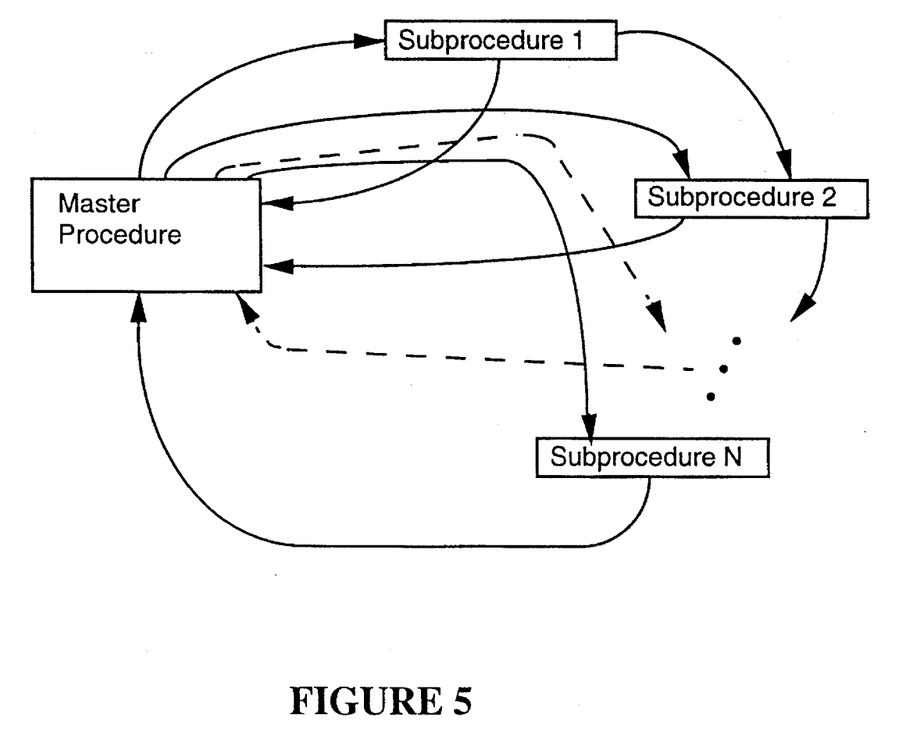
FIG. 5 depicts a finite state diagram for a hyperlink based test case control system.

FIG. 5 shows an example state diagram of the operation of the present invention. The master procedure serves as the initial state in the operation of the present invention from which various procedures are launched. After the user selects an option, the associated subprocedures are called via the hyperlinks. FIG. 5 shows that a subprocedure can be called from the master procedure or from any other subprocedure. The links can be passed to any of the subprocedures or kept by the master procedure to provide for the launching and execution of any selected subprocedure.

Figure 6:
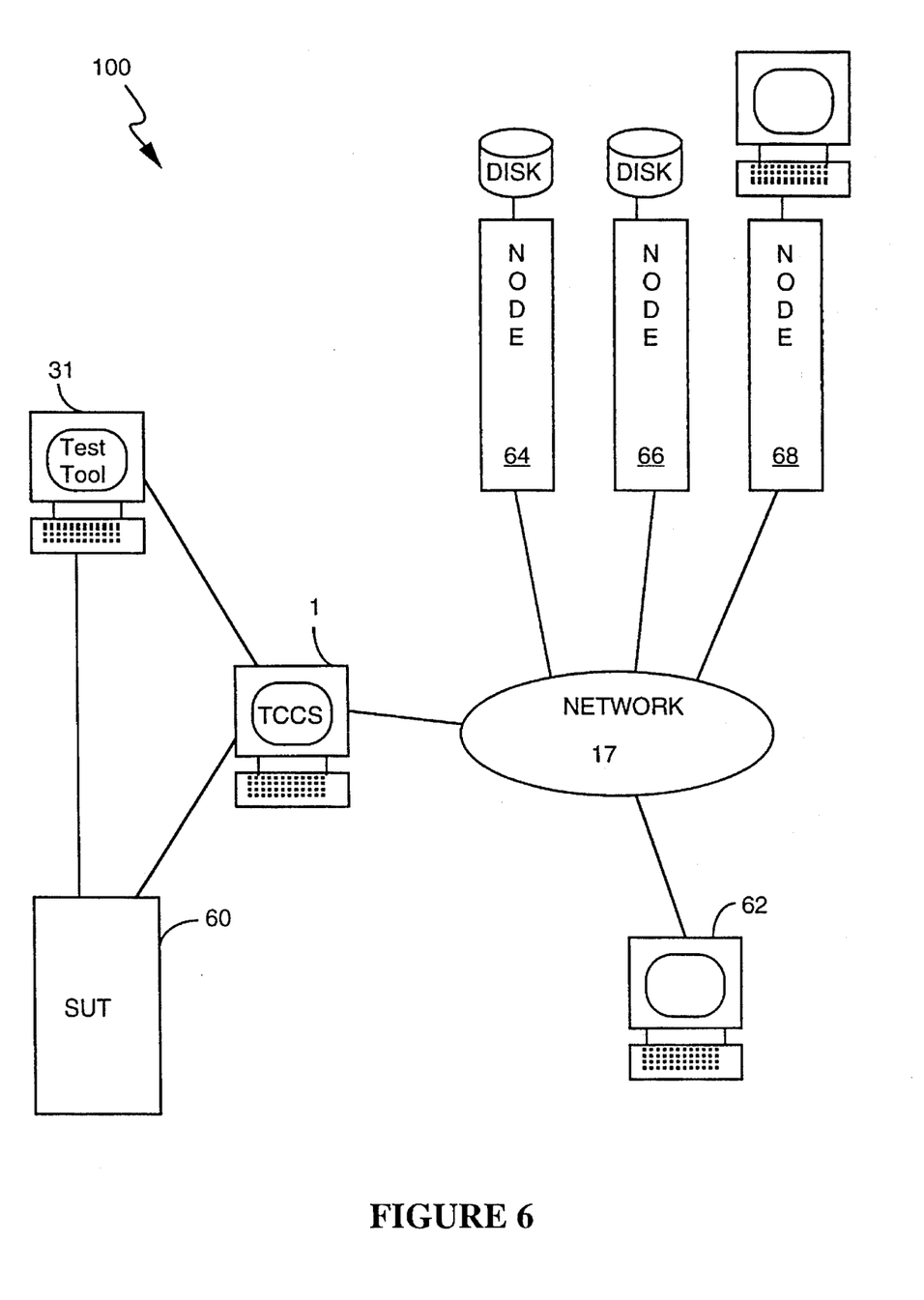
FIG. 6 depicts a network version of the test case control system.

FIG. 6 shows a network version 100 of the TCCS. This version shows the TCCS 1, a network 17, test tool 58, a debug terminal node 62, a series of other network nodes 64, 66, 68, and the SUT 60. This network version permits the TCCS 1 to link with other computers and test tools to obtain and share information on the network.

In the preferred embodiment, the network is an ethernet network running standard ethernet server software. The network software serves the nodes and the TCCS in order to permit access and transfer of information over the network.

The network is configured so that a number of test engineers can access remote testing environments from the convenience of a local terminal. This permits a test engineer to be at his desk and access test cases and documents from other parts of the building or the country. Thus, a test engineer has access to additional information and can connect to remote SUT and test tools to accomplish a test case or view test case results or other information.

EXAMPLE TEST CASE

NOTE: All bracketed items {} indicate hyperlinks to subprocedures.

Product: Voice Gateway Version 3.00

Feature: Comm/DOS

Modification History:

| Date | Author | Change |
| --- | --- | --- |
| 02/14/94 | TMF | initial revision |

Goals/Objective:

Testing call sequence 0520 for the telephony system

Skills Necessary:
1. SpeakIt programming experience
2. Modem use experience

Requirements:
1. DOS machine with Comm/DOS hardware and software
2. Lotus 1-2-3 application software
3. VG Comm/DOS Option Disk
4. Software {SW-VG-300-COMD-001-0}
5. Test Script {TS-VG-300-COMD-001-0}

References:
1. Test Case Specification Document {TCSD-00520}
2. Test Case History Document {TCHD-00520}
3. Test Case Results {TCR-00520}
4. General Information Document {GEN-INFO-005}
5. Comm/DOS Functional Specification {CD-FUNC-053}

Setup:
1. Install Comm/DOS software on VG system {DP-9998}
2. Install Comm/DOS software on DOS machine {GP-997}
3. Connect DOS machine to VG system {DP-9999}

Test Steps:
1. Begin runtime system {BR-0559}
2. Halt runtime system {HALT}

Test Results:
☐ Review Test Results {RVW}
☐ Retest {RTST}
END OF TEST CASE

ALTERNATE EMBODIMENTS

An alternate embodiment of the present invention is to connect the TCCS to the SUT using a direct communication path. For example the communication path need not be a telephone line but could be a RS-232 line, and IEEE 488 line or a custom line. This permits testing of alternate communication configurations that might be used in the future to provide additional interactive services such as video services.

Moreover, this alternate embodiment can support a communication path to an auxiliary port on the SUT. This configuration provides for the testing and monitoring of additional real time services such as video that require greater bandwidth than audio. This can be performed while the SUT is in real time operation.

Modifications and variations may be made to the disclosed embodiments without departing from the subject and spirit of the invention as defined by the following claims.

What is claimed is:

1. A test case control system for controlling testing of a system under test (SUT), said test case control system comprising:

a memory for storing a plurality of procedures;

a plurality of files stored in said memory;

a plurality of test cases stored in said memory, each test case having hyperlinks to a plurality of said procedures as well as to a plurality of said files;

said files including a plurality of human readable documents with text concerning ones of said procedures, test cases and/or SUT:

at least one of said test cases including text concerning a sequence of said procedures and hyperlinks to respective ones of said procedures positioned adjacent to corresponding portions of said text in said one test case, said at least one of said test cases further including text indicating availability of additional information concerning specified topics and hyperlinks to respective ones of said files positioned adjacent corresponding portions of said text;

a communication path for communicating with said SUT;

a display;

a master procedure for displaying on said display any selected one of said test cases and for displaying user selectable options corresponding to said hyperlinks in said selected test case;

said master procedure enabling hyperlinked launching of each procedure corresponding to user selected options and hyperlinked loading of each file corresponding to user selected options, said master procedure further enabling user modification of selected ones of said stored files and storage of modified files in said memory; and a processor configured to execute said plurality of procedures and to generate a plurality of signals, said processor including a transmitter that transmits said plurality of signals to said SUT via said communication path, and said processor including a receiver that receives a plurality of signals from said SUT via said communication path.

2. A test case control system as in claim 1, wherein:

said SUT is an interactive voice messaging system and said communication path includes an audio signal path.

3. A test case control system as in claim 1, wherein:

said system includes a test tool;

said stored files include test scripts to be loaded into said test tool for execution; and said user selectable options displayed by said master procedure for said selected test case include a user selectable test script loading option, wherein user selection of said test script loading option causes said master procedure to load a corresponding test script into said test tool for execution.

4. A test case control system as in claim 1, wherein:

said stored files include test scripts to be loaded into said SUT for execution; and said user selectable options displayed by said master procedure for said selected test case include a user selectable test script loading option, wherein user selection of said test script loading option causes said master procedure to load a corresponding test script into said SUT for execution.

5. A test case control system as in claim 1, wherein:

said files include documents corresponding to various ones of said test cases;

said user selectable options displayed by said master procedure for said selected test case include a user selectable document retrieval option for retrieving a specific one of said documents;

said master procedure including a document subprocedure for retrieving, displaying and modifying said one document corresponding to said user selectable document retrieval option.

6. A test case control system as in claim 1, wherein:

said files include documents corresponding to various ones of said test cases;

said user selectable options displayed by said master procedure for said selected test case include a plurality of user selectable document retrieval options for retrieving corresponding ones of said documents; and said master procedure including a document subprocedure for retrieving, displaying and modifying said documents corresponding to said user selectable document retrieval options.

7. A test case control system as in claim 1, wherein said system includes a test report procedure for generating test reports indicating results of executed test cases and a test report reader procedure for retrieving and displaying said test reports.

8. A test case control system as in claim 1, wherein said memory includes computer memories in computers interconnected by a network having a multiplicity of nodes, and said files and procedures are stored in said computer memories in a plurality of said computers at different network nodes.

9. A test case control system as in claim 1, wherein:

said processor including a test tool; and said plurality of procedures including test scripts to be loaded into said test tool for execution.

10. A test case control system for controlling testing of a system under test (SUT), said test case control system comprising:

a memory for storing a plurality of procedures, said plurality of procedures including test scripts;

a plurality of files stored in said memory;

a plurality of test cases stored in said memory, each test case having hyperlinks to a plurality of said procedures as well as to a plurality of said files;

said files including a plurality of human readable documents with text concerning ones of said procedures test cases and/or SUT;

at least one of said test cases including text concerning a sequence of said procedures and hyperlinks to respective ones of said procedures positioned adjacent to corresponding portions of said explanatory text, said at least one of said test cases further including text indicating availability of additional information concerning specified topics and hyperlinks to respective ones of said files positioned adjacent corresponding portions of said text:

a communication path for communicating with the SUT;

a display;

a processor configured to execute a master procedure that displays on said display any selected one of said test cases and that displays user selectable options corresponding to said hyperlinks in said selected test case;

said master procedure enabling hyperlinked launching of each procedure corresponding to user selected options and hyperlinked loading of each file corresponding to user selected options, said master procedure further enabling user modification of selected ones of said stored files and storage of modified files in said memory; and a test tool that executes said test scripts and generates a plurality of signals, said test tool including a transmitter that transmits said plurality of signals to said SUT via said communication path, and said test tool including a receiver that receives a plurality of signals from said SUT via said communication path.

11. A method of controlling testing of a system under test (SUT) with a test case control system (TCCS) having a processor and a memory storing a plurality of procedures and files, said method comprising the steps of:

storing a plurality of test cases in said memory, each test case having hyperlinks to a plurality of said procedures as well as to a plurality of said files;

said files including a plurality of human readable documents with text concerning ones of said procedures test cases and/or SUT:

at least one of said stored test cases including text concerning a sequence of said procedures and hyperlinks to respective ones of said procedures positioned adjacent to corresponding portions of said explanatory text, said at least one of said test cases further including text indicating availability of additional information concerning specified topics and hyperlinks to respective ones of said files positioned adjacent corresponding portions of said text:

displaying any selected one of said test cases and displaying user selectable options corresponding to said hyperlinks in said selected test case;

hyperlinked launching of each procedure corresponding to user selected ones of said options and hyperlinked loading of each file corresponding to user selected ones of said options;

enabling user modification of selected ones of said stored files and storage of modified files in said memory; and executing said plurality of procedures in said processor;

generating a plurality of signals corresponding to said executing step; and communicating said generated plurality of signals to the SUT over a communication path.

12. A method as in claim 11, wherein said SUT is an interactive voice messaging system, and wherein:

said communicating step includes audio signal communication.

13. A method as in claim 11, wherein said TCCS further includes a test tool, and said method further comprises:

communicating with said test tool over a second communication path; and loading said stored files into said test tool for execution, said stored files including test scripts; and said displaying step includes displaying a user selectable test script loading option, wherein user selection of said test script loading option causes loading of a corresponding test script into said test tool for execution.

14. A method as in claim 11, wherein said stored files include test scripts to be loaded into said SUT for execution, and wherein:

said displaying step includes displaying a user selectable test script loading option; and, user selection of said test script loading option causes loading of a corresponding test script into said SUT for execution.

15. A method as in claim 11, wherein said files include documents corresponding to various ones of said test cases, and wherein:

said displaying step includes displaying a user selectable document retrieval option for retrieving a specific one of said documents; and when said document retrieval option is selected, retrieving a document corresponding to the specific one of said documents, and displaying the document corresponding to the specific one of said documents.

16. A method as in claim 11, wherein said files include documents corresponding to various ones of said test cases, and wherein:

said displaying step includes displaying a plurality of user selectable document retrieval options for retrieving corresponding ones of said documents;

when one of said plurality of document retrieval options is selected, retrieving a document corresponding to the specific one of said documents, and displaying the document corresponding to the specific one of said documents; and when another of said plurality of document retrieval options is selected, modifying the document corresponding to the specific one of said documents.

17. A method as in claim 11, wherein said files include test reports corresponding to various ones of said test cases, and wherein:

said displaying step includes displaying a user selectable test report retrieval option for retrieving a test report result; and when said test report retrieval option is selected, retrieving a corresponding test report indicating the results of executed test cases, and displaying the test report.

18. A method as in claim 11, further comprising the step of:

communicating with other computers over a network having a multiplicity of nodes; and wherein said communicating step includes communicating said files and procedures with a plurality of said computers at different network nodes.

19. A method of controlling testing of a system under test (SUT) with a test case control system (TCCS) having a processor and a memory storing a plurality of procedures and files, said method comprising the steps of:

storing in said memory a plurality of test cases, each test case having hyperlinks to a plurality of said procedures as well as to a plurality of said files; said plurality of procedures including test scripts;

said files including a plurality of human readable documents with text concerning ones of said procedures, test cases and/or SUT:

at least one of said stored test cases including text concerning a sequence of said procedures and hyperlinks to respective ones of said procedures positioned adjacent to corresponding portions of said explanatory text, said at least one of said test cases further including text indicating availability of additional information concerning specified topics and hyperlinks to respective ones of said files positioned adjacent corresponding portions of said text;

displaying any selected one of said test cases and displaying user selectable options corresponding to said hyperlinks in said selected test case;

hyperlinked launching of each procedure corresponding to user selected ones of said options and hyperlinked loading of each file corresponding to user selected ones of said options;

enabling user modification of selected ones of said stored files and storage of modified files in said memory; and executing said plurality of procedures in said processor;

said hyperlinked launching step including loading and executing ones of said test scripts in a test tool, said test tool generating a plurality of signals while executing said test scripts, transmitting said plurality of signals to said SUT via a communication path, and receiving a plurality of signals from said SUT via said communication path.

* * * * *